Aug. 14, 1956   O. J. GERBRACHT   2,758,530
ROW CROP WEEDER AND CULTIVATOR
Filed Jan. 3, 1952                                                2 Sheets-Sheet 1
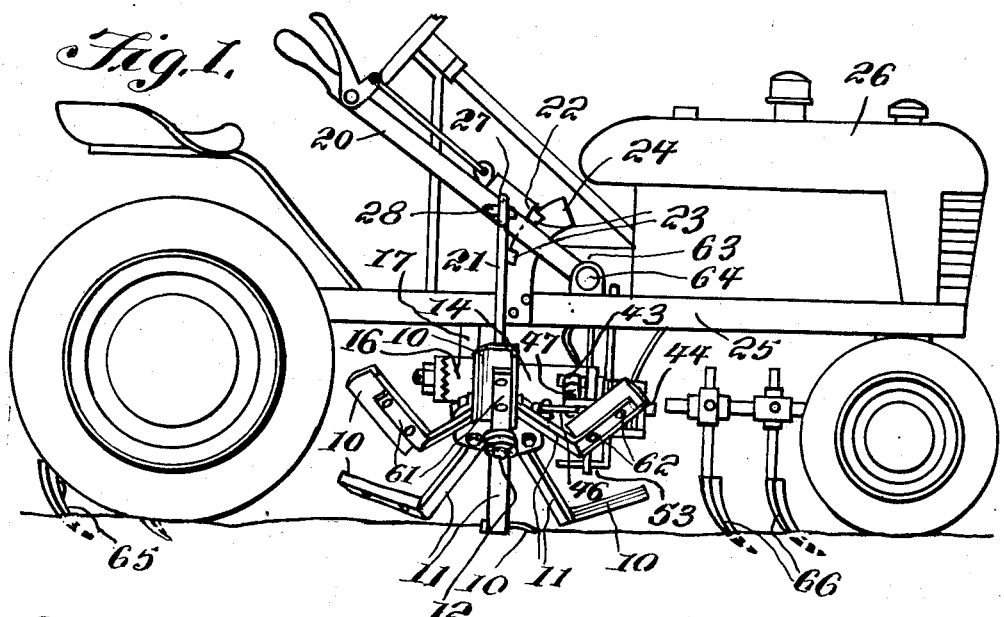
INVENTOR.
Osceola J. Gerbracht,
BY Victor J. Evans & Co.
ATTORNEYS

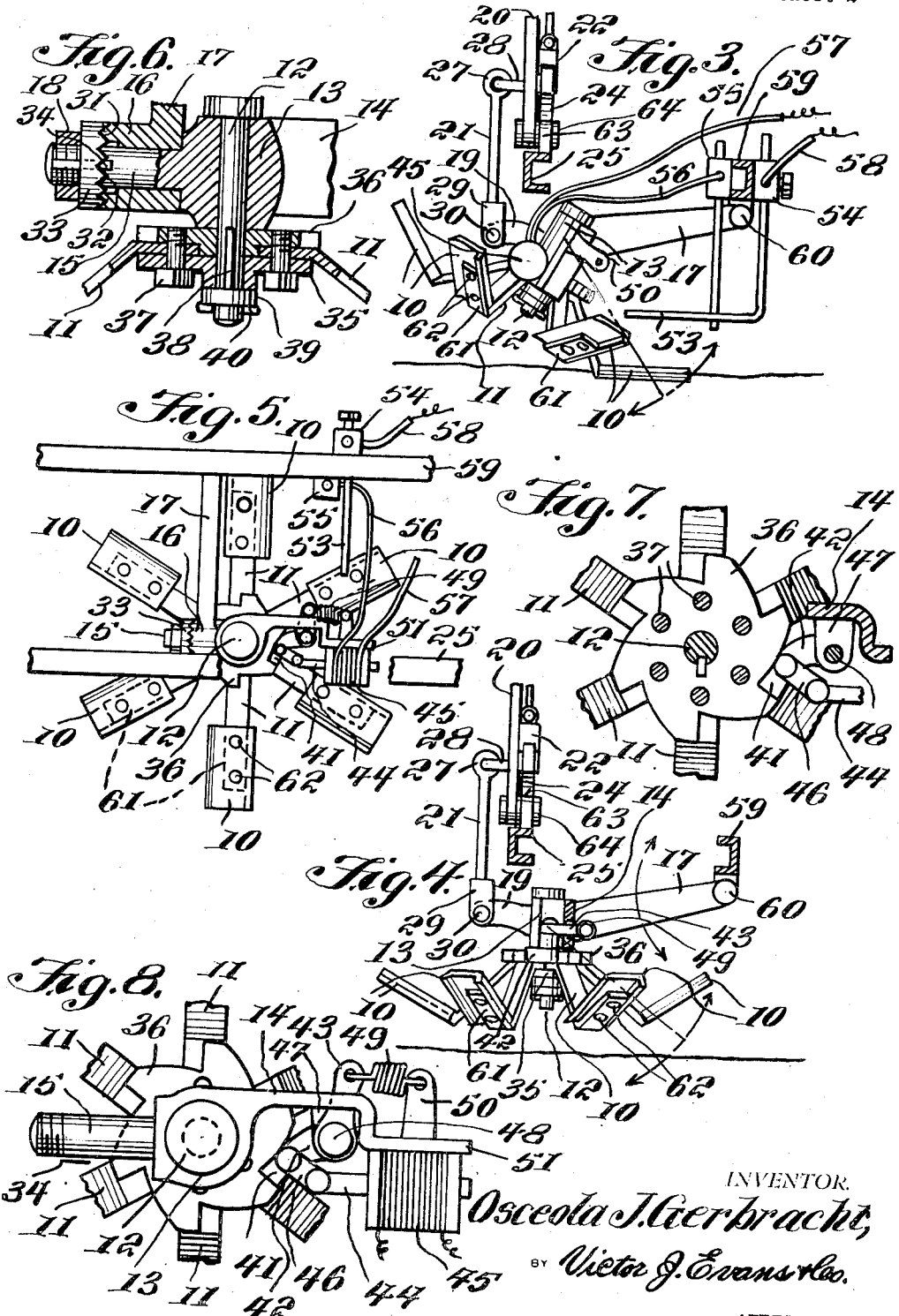

United States Patent Office 2,758,530
Patented Aug. 14, 1956

2,758,530
ROW CROP WEEDER AND CULTIVATOR
Osceolo J. Gerbracht, Hettinger, N. Dak.

Application January 3, 1952, Serial No. 264,706

4 Claims. (Cl. 97—46.89)

This invention relates to farm implements, and in particular to a rotatable unit having radially disposed blades angularly positioned thereon in which the vertical axis of the unit is tilted whereby a blade at one side of the unit is parallel to the ground over which the unit is traveling and in which a solenoid actuated ratchet is provided for preventing rotation of the unit until a blade of the unit comes in contact with an obstruction, such as a plant or the like.

The purpose of this invention is to provide a weeding device in which blades project between plants in a row and are released as a blade approaches a plant so that weeds may be scraped from the soil between the plants without damaging the plants.

Various types of weeding devices and cultivators have been used for working around and weeding plants in a row such as rows of corn, sugar cane, berries and small trees and although it is possible to reach weeds comparatively close to the plants it is difficult to reach weeds in the rows between the plants. With this thought in mind this invention contemplates a rotating cultivator with automatically actuated releasing means whereby blades are held in scraping positions as the device travels from one plant to another and wherein the blades are released to by-pass the plants as the device travels over a row of plants.

The object of this invention is, therefore, to provide means for mounting a rotating cultivator whereby radially disposed blades are supported in meshing relation with plants of a row so that the blades work in between the plants with the plants passing into areas between the blades.

Another object of the invention is to provide automatic trip means for holding blades of a rotating cultivator whereby the blades are automatically released as they approach an obstruction.

A further object of the invention is to provide a weeder having radially disposed angularly positioned rotating blades in which the blades mesh with plants in a row for cleaning areas between the plants without damaging the plants, which is of a comparatively simple and economical construction.

With these and other objects and advantages in view the invention embodies a hub having radially disposed angularly positioned blades extended therefrom, a bracket for pivotally mounting the hub on the frame of a tractor and a solenoid actuated ratchet whereby the blades are held in operative position until released by the solenoid.

Other features and advantages of the invention will appear from the following description taken in connection with the drawings, wherein:

Figure 1 is a side elevational view of a tractor having the improved weeder mounted on the frame thereof and showing the weeder with a blade on one side in an operative position.

Figure 2 is a plan view with the tractor omitted and showing the rotating blades with the trip device in combination therewith and also showing the conventional cultivator plows preceding and following the device.

Figure 3 is a cross section through the tractor showing the frame at one side and illustrating the weeding element with the parts in the position as shown in Figure 1.

Figure 4 is a similar section showing a part of the weeding element adjusted to a position for transportation wherein the base of the element is horizontally positioned.

Figure 5 is a plan view of the device with the rotating elements in the positions as illustrated in Figure 4.

Figure 6 is a detail on an enlarged scale showing a section through the mounting elements of the digger blades and brackets.

Figure 7 is a plan view illustrating the blade holding ratchet and also showing the parts on an enlarged scale.

Figure 8 is a similar view illustrating the ratchet in the position in which a tooth thereof is approaching the locking pin which holds the ratchet and weeding blades stationary.

Figure 9 is a diagrammatic view showing a plan view of the blades of the digger with one of the blades approaching a plant and with a spring finger for actuating the releasing means of the digger in engagement with the plant.

Figure 10 is a similar view showing a device passing a plant wherein the plant is positioned in an area between two of the blades.

Referring now to the drawings wherein like reference characters denote corresponding parts the improved cultivator and weeder of this invention includes a plurality of radially disposed blades 10, carried by arms 11, rotatably mounted by a pin 12 in a hub 13 of a bracket 14 and the hub is pivotally mounted by a pin 15 in a hub 16 on the end of an arm 17 and the position thereof is controlled by a nut 18 threaded on the end of the pin 15.

The hub 13 is also provided with a lug 19 which is connected to a hand lever 20 with a rod 21 whereby the unit is elevated by the lever with a latch 22 thereof engaging notches 23 in a segment 24 mounted on a bar 25 of a tractor 26.

An eye 27 at the upper end of the rod 21 is secured in an eye 28 on the lever 20 and a yoke 29 on the lower end of the rod 21 is pivotally connected to the lug 19 of the hub 13 with a pin 30.

The end of the hub 16 is formed with teeth 31 and corresponding teeth 32 are provided in a face of a washer 33 whereby with the washer secured to the pin 15 with a key 34 the angular position of the blade units is adjustable by loosening and tightening the nut 18.

The arms 11 of the blades 10 are secured between a flange 35 and a ratchet 36 with bolts 37 and the flange 35 is secured to the hub of the ratchet with a key 38. The lower end of the pin 12 is provided with a washer 39 and the washer is held in position by a cotter pin 40.

The teeth of the ratchet wheel 36 are positioned to engage an end 41 of an arm 42 of a bell crank 43, and the end 41 is connected to the core 44 of a solenoid 45 by a link 46.

The bell crank 43 is pivotally mounted on a lug 47 of the bracket 14 by a pin 48 and, as illustrated in Figure 8 the bell crank is resiliently held in the position wherein the pin 41 is in the path of the teeth of the ratchet 36 by a spring 49, one end of which is secured to the bell crank and the other to a lug 50 which extends from a section 51 of the bracket 14 and on which the solenoid 45 is carried.

The pin 41, which is positioned in the path of the teeth of the ratchet wheel 36, is withdrawn by the solenoid 45 as the solenoid is energized whereby with the unit traveling in the direction of the arrows in Figures 9 and 10 the unit is released as a blade 10 approaches a plant as indicated by the numeral 52 wherein a spring finger 53, which engages the plant and which is pivotally mounted in a contact lock 54, is actuated by the plant to engage a contact 55 which completes a circuit to the solenoid 45 through wires 56 and 57, the wire 57 being extended to a source of current supply and the circuit being completed through the contacts 54 and 55 and the wire 58 extended from the contact 54.

By this means the blade 10 is released as it approaches the plant 52 as shown in Figure 9 whereby one blade moves away from the path of the plant and another blade enters the path or row, as illustrated in Figure 10. As the spring finger 53 passes over a plan it snaps forwardly, thereby breaking the circuit to the solenoid and the spring 49 snaps the pin 41 back into the position, as illustrated in Figure 8, where it engages the next tooth of the ratchet wheel. The following blade is, therefor, retained in operative position, as shown in Figure 10 whereby the soil is cultivated or weeds scraped therefrom in the area between the plants.

The arm 17 is pivotally attached to a side beam 59 of the tractor with a pivotal connection 60, and a spring finger 53 and contacts 54 and 55 are carried by the beam 59, as illustrated in Figure 3.

The cutting blades or plates 10 are L-shaped in cross section and these blades may be secured to the ends 61 of the arms 11 with rivets 62, as shown, or by other suitable means.

The weeding device or cultivator of this invention may, therefor, be suspended in an elevated position, as illustrated in Figure 4, for transportation and when it is desired to use the device the element is rotated about the pin 15 and secured in a position whereby a blade on the low side is substantially parallel to the ground or positioned at a slight angle, as may be desired. With the blade in position the elevation of the device is adjusted by the hand lever 20, whereby the latch 22 is moved from one notch to another.

The arms 17, contacts 54 and 55 and the lever 20 may be mounted on a tractor frame of a suitable design, the hand lever 20 being pivotally mounted in a bearing 63 with a pin 64 or the parts may be attached to a cultivator frame or to an implement or device of a suitable design.

The weeder may be used independently or it may be used in combination with shovels as indicated by the numerals 65 and 66 or other devices.

It will be understood that modifications may be made in the design and arrangement of the parts without departing from the spirit of the invention.

What is claimed is:

1. In a weeder and cultivator, the combination which comprises a hub having a pin extended from one side, a shaft journalled in the hub, radially disposed arms carried by the shaft, said arms having angularly disposed outer ends, cutting blades carried by the outer ends of the arms, an arm having a pin receiving portion on an extended end adapted to be attached to a tractor frame, said pin extended from one side of the hub in which the shaft is journaled and pivotally mounted in the pin receiving portion of the arm adapted to be attached to the tractor frame, means locking the pin in the pin receiving portion of the arm in adjusted positions, whereby the blades carried by the radially disposed arms are adjusted to positions parallel with a surface above which the device is positioned, means preventing rotation of the arms and blades, and means actuating the means preventing rotation of the arms and blades whereby the blades rotate to by-pass a plant or other obstruction.

2. In a weeder and cultivator unit as described in claim 1, means elevating the hub with the arms and blades therein.

3. In combination with a weeder and cultivator as described in claim 1, a hand lever having a latch thereon connected to the arm having the pin receiving portion and with a rod providing means for elevating the hub with the arms and blades.

4. In a weeder and cultivator the combination which comprises a hub, a shaft journalled in said hub, radially disposed arms carried by the shaft, said arms having angularly disposed outer ends, cutting blades carried by the outer ends of the arms, means for pivotally mounting said hub on a tractor frame, means for locking said last mentioned means in adjusted positions whereby the blades carried by the radially disposed arms are adjusted to positions parallel with the surface above which the device is positioned, means preventing rotation of the arms and blades, said means comprising a ratchet wheel positioned at the inner ends of said arms, and a solenoid actuated pin positioned in the path of the ratchet wheel and energized by a spring finger positioned to engage an obstruction in the path of one of the said blades, and means actuating the means preventing rotation of the arms and blades whereby the blades are released to by-pass a plant or obstruction.

References Cited in the file of this patent

UNITED STATES PATENTS

| 390,004 | Cook | Sept. 25, 1888 |
| 556,075 | Whipple | Mar. 10, 1896 |
| 1,128,461 | Kuehne | Feb. 16, 1915 |
| 1,610,587 | Randolph et al. | Dec. 14, 1926 |
| 2,253,419 | Cunningham | Aug. 19, 1941 |
| 2,275,380 | Kidman et al. | Mar. 3, 1942 |
| 2,442,095 | Reed et al. | May 25, 1948 |
| 2,484,069 | Boncompain | Oct. 11, 1949 |
| 2,668,488 | Shimmon | Feb. 9, 1954 |

FOREIGN PATENTS

| 565,703 | France | Nov. 10, 1923 |
| 220,448 | Switzerland | July 1, 1942 |
| 221,526 | Switzerland | Aug. 17, 1942 |